(12) United States Patent
Anderson et al.

(10) Patent No.: US 10,099,434 B2
(45) Date of Patent: Oct. 16, 2018

(54) COMPOSITE AIRFOIL STRUCTURES

(71) Applicant: General Electric Company, Schenectady, NY (US)

(72) Inventors: Todd Alan Anderson, Niskayuna, NY (US); Nicholas Joseph Kray, Mason, OH (US); Gregory Carl Gemeinhardt, Park Hills, KY (US); Michael Harvey Schneider, Loveland, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 923 days.

(21) Appl. No.: 14/487,428

(22) Filed: Sep. 16, 2014

(65) Prior Publication Data

US 2016/0076552 A1   Mar. 17, 2016

(51) Int. Cl.
| | |
|---|---|
| *B29C 70/38* | (2006.01) |
| *F01D 5/28* | (2006.01) |
| *F04D 29/32* | (2006.01) |
| *B29C 70/20* | (2006.01) |
| *B29K 105/08* | (2006.01) |

(Continued)

(52) U.S. Cl.
CPC .......... *B29C 70/382* (2013.01); *B29C 70/202* (2013.01); *F01D 5/282* (2013.01); *F04D 29/324* (2013.01); *B29D 99/0025* (2013.01); *B29K 2063/00* (2013.01); *B29K 2105/0005* (2013.01); *B29K 2105/089* (2013.01); *B29L 2031/08* (2013.01); *F05D 2220/36* (2013.01); *F05D 2300/224* (2013.01); *F05D 2300/44* (2013.01);
(Continued)

(58) Field of Classification Search
CPC ................ B32B 2603/00; B32B 7/005; B32B 2260/023; F05D 2300/603; F05D 2300/614; F01D 5/14; B23P 15/02; B23P 15/04; Y10T 29/49337; B29C 70/38; B29C 70/382; B29C 70/386; F04D 29/388
USPC ........................................................ 416/230
See application file for complete search history.

(56) References Cited

U.S. PATENT DOCUMENTS

| | | | | |
|---|---|---|---|---|
| 3,501,090 A | * | 3/1970 | Losee | F01D 5/282 |
| | | | | 416/189 |
| 3,754,840 A | * | 8/1973 | Zincone | B64C 27/473 |
| | | | | 416/226 |

(Continued)

OTHER PUBLICATIONS

Dell'Anno et al., "Automated Manufacture of 3D Reinforced Aerospace Composite Structures", International Journal of Structural Integrity vol. 3, Issue: 1, pp. 22-40, 2010.

(Continued)

*Primary Examiner* — Jason L Vaughan
(74) *Attorney, Agent, or Firm* — GE Global Patent Operation; Nitin Joshi

(57) ABSTRACT

An airfoil structure is presented. The airfoil structure includes an outer casing substantially surrounding a composite core. The composite core includes a plurality of fiber bands, each of the plurality of fiber bands is placed at a predetermined position and orientation at a time, wherein the plurality of fiber bands are interwoven in an in-plane and out-of-plane orientation by interleaving each of the plurality of fiber bands placed in a plane with one or more of the plurality of fiber bands of an adjacent plane to define an interleaved structure. A method for manufacturing an airfoil structure including the composite core is also presented.

13 Claims, 5 Drawing Sheets

(51) Int. Cl.
  *B29K 63/00* (2006.01)
  *B29K 105/00* (2006.01)
  *B29L 31/08* (2006.01)
  *B29D 99/00* (2010.01)

(52) U.S. Cl.
  CPC ..... *F05D 2300/6034* (2013.01); *Y02T 50/672* (2013.01)

(56) References Cited

U.S. PATENT DOCUMENTS

| | | | | |
|---|---|---|---|---|
| 4,255,478 A * | 3/1981 | Crane | ................... | B29C 70/083 |
| | | | | 416/230 |
| 4,381,960 A * | 5/1983 | Pinter | ................... | B29C 53/585 |
| | | | | 156/175 |
| 4,412,784 A * | 11/1983 | Wackerle | .............. | B64C 27/473 |
| | | | | 416/229 R |
| 4,413,860 A * | 11/1983 | Prescott | ................... | B29C 70/08 |
| | | | | 301/64.703 |
| 5,222,297 A * | 6/1993 | Graff | ..................... | B29C 70/865 |
| | | | | 29/889.7 |
| 5,269,657 A * | 12/1993 | Garfinkle | ................ | B29C 70/20 |
| | | | | 244/124 |
| 5,279,892 A | 1/1994 | Baldwin et al. | | |
| 5,499,904 A * | 3/1996 | Wallace | .................. | F03D 3/062 |
| | | | | 416/225 |
| 5,632,602 A * | 5/1997 | Herrmann | ............... | F03D 1/065 |
| | | | | 416/226 |
| 6,053,696 A * | 4/2000 | Roberts | ................. | F01D 21/045 |
| | | | | 415/200 |
| 6,989,197 B2 | 1/2006 | Schneider | | |
| 7,101,154 B2 | 9/2006 | Dambrine et al. | | |
| 8,038,408 B2 | 10/2011 | McMillan | | |
| 8,419,374 B2 * | 4/2013 | Huth | ....................... | B29C 70/24 |
| | | | | 416/224 |
| 8,454,788 B2 | 6/2013 | Kisch | | |
| 8,499,450 B2 | 8/2013 | Naik | | |
| 8,607,454 B2 | 12/2013 | Blanchard et al. | | |
| 8,657,581 B2 * | 2/2014 | Pilpel | ..................... | F03D 3/062 |
| | | | | 415/4.1 |
| 8,663,526 B2 * | 3/2014 | Duqueine | ............. | B29C 33/405 |
| | | | | 264/258 |
| 8,709,575 B2 * | 4/2014 | Marissen | .............. | F41H 5/0428 |
| | | | | 139/383 R |
| 8,808,847 B2 * | 8/2014 | Jevons | ..................... | F01D 5/282 |
| | | | | 415/200 |
| 9,296,189 B2 * | 3/2016 | Ralfs | .................... | B29C 33/0011 |
| 9,488,056 B2 * | 11/2016 | Nagle | ...................... | F01D 5/147 |
| 9,616,629 B2 * | 4/2017 | Fabre | ................. | B29D 99/0025 |
| 2005/0158171 A1 * | 7/2005 | Carper | .................... | B32B 18/00 |
| | | | | 415/200 |
| 2010/0014982 A1 * | 1/2010 | Haje | ........................ | F01D 5/282 |
| | | | | 416/241 R |
| 2011/0206875 A1 | 8/2011 | Kohlen | | |
| 2011/0299994 A1 * | 12/2011 | Behnisch | ................ | F01D 5/282 |
| | | | | 416/230 |
| 2012/0171477 A1 | 7/2012 | Sang et al. | | |
| 2013/0272893 A1 | 10/2013 | Fabre et al. | | |
| 2013/0280476 A1 * | 10/2013 | Davis | ........................ | B32B 5/12 |
| | | | | 428/109 |
| 2014/0110633 A1 * | 4/2014 | Pratte | .................. | B32B 38/0008 |
| | | | | 252/500 |
| 2014/0161621 A1 * | 6/2014 | Kray | ....................... | F01D 5/147 |
| | | | | 416/226 |

OTHER PUBLICATIONS

Rhead et al., "The Effect of Tow Gaps on Compression After Impact Strength of Robotically Laminated Structures", Composites Research Unit Department of Mechanical Engineering, University of Bath, Claverton Down, Bath, BA2 7AY, UK, pp. 1-9.

Akangah et al., "Assessment of Impact Damage Resistance and Tolerance of Polymer Nanofiber Interleaved Composite Laminates", Journal of Chemical Science and Technology, vol. 2 Iss. 2, pp. 39-52, Apr. 2013.

Hiel et al., "Damage Tolerance of a Composite Sandwich with Interleaved Foam Core", Journal of Composites, Technology and Research, vol. 14, Issue 3, pp. 155-168, Sep. 1992.

Yoon et al., "Fiber Preform Architecture for Composite Articles and Method of Fabrication", U.S. Appl. No. 13/906,127, filed May 30, 2013, 30 Pages.

* cited by examiner

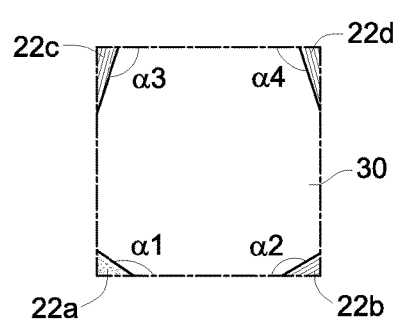
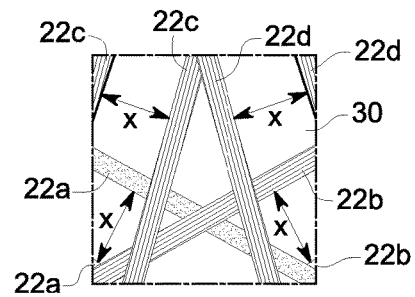
FIG. 9    FIG. 10
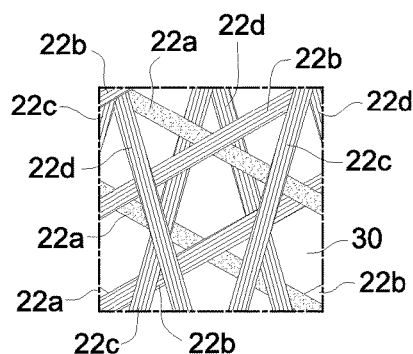
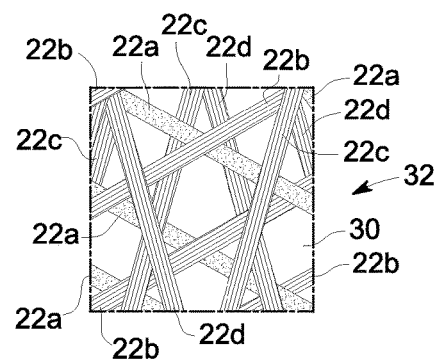
FIG. 11    FIG. 12
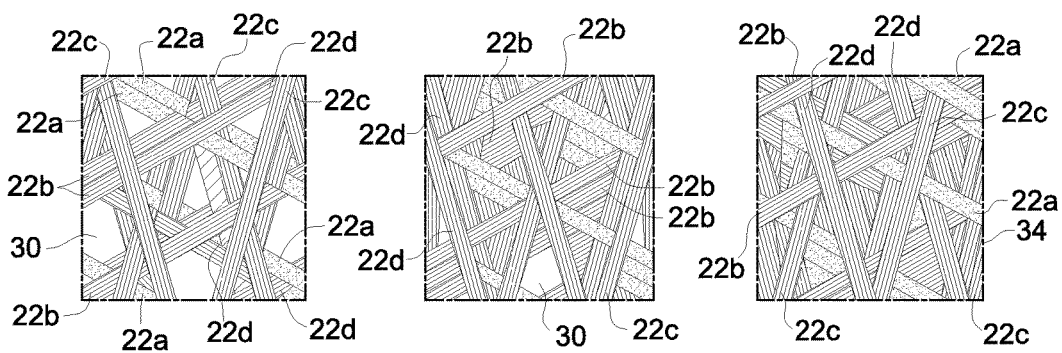
FIG. 13    FIG. 14    FIG. 15

COMPOSITE AIRFOIL STRUCTURES

BACKGROUND

The present invention relates generally to airfoil structures for turbine engines, and more particularly to airfoil structures including a composite core.

Composite blades developed for commercial aircraft engine fan blades may be constructed of laminated carbon/epoxy "prepreg" material. A "prepreg" is a layer of fibers, for example carbon fibers impregnated with a resin and arranged to form a lamina or a cloth. Prepreg layers may be layered and cured to form a composite structure or laminate. The laminates may experience interlaminar separation under certain circumstances. Moreover, when laminated fan blades are subject to high energy impacts (e.g., birds, or other foreign objects), the interlaminar separation can result in delamination and a reduction in the blade's structural integrity.

The shear stresses that may tend to delaminate the blade structure are generated when the composite blade is subjected to high twisting and bending loads. These loads normally result from impacts which often occur on the leading edge of the blade. When the blade is subjected to an impact, the peak shear stresses tend to be transmitted to the middle of the blade, as well as the leading and trailing edges.

Previous attempts to improve resistance to delamination of composite fan blades have involved, for example, stitching a full-sized "all prepreg" blade before cure, or by using 3D woven structures. 3-D type woven structures have been researched extensively to increase the delamination resistance and decrease the damage area during the impact, where a certain number of reinforcement fiber tows were woven in a through-thickness direction or partially through-thickness direction. However 3-D woven based blades may have lower stiffness and initial failure strain.

Thus, it would be desirable to provide improved structures for composite fan blades that provide high impact resistance, superior damage tolerance and less complex manufacturing.

BRIEF DESCRIPTION

In one embodiment, an airfoil structure is presented. The airfoil structure includes an outer casing substantially surrounding a composite core. The composite core includes a plurality of fiber bands, each of the plurality of fiber bands is placed at a predetermined position and orientation at a time, wherein the plurality of fiber bands are interwoven in an in-plane and out-of-plane orientation by interleaving each of the plurality of fiber bands placed in a plane with one or more of the plurality of fiber bands of an adjacent plane to define an interleaved structure.

One embodiment is directed to a method for manufacturing an airfoil structure. The method includes
  (a) disposing a first set of a plurality of unidirectional prepreg layers,
  (b) disposing a plurality of fiber bands at a predetermined position and orientation at a time so as to interweave the plurality of fiber bands in an in-plane and out-of-plane orientation by interleaving each of the plurality of fiber bands placed in a plane with one or more of the plurality of fiber bands of an adjacent plane to define an interleaved structure to form a composite core disposed on the first set of the plurality of unidirectional prepreg layers; and
  (c) disposing a second set of the plurality of unidirectional prepreg layers on the composite core to form the airfoil structure.

In one embodiment, the airfoil structure is manufactured on a single tool by using an automated fiber placement process.

BRIEF DESCRIPTION OF THE FIGURES

The above and other features, aspects, and advantages of the present disclosure will become better understood when the following detailed description is read with reference to the accompanying drawings in which like characters represent like parts throughout the drawings, wherein:

FIGS. 9-15 schematically illustrate steps 1-6 for forming a fiber preform for composite core, in accordance with one embodiment of the invention;

DETAILED DESCRIPTION

In the following specification and the claims, which follow, reference will be made to a number of terms, which shall be defined to have the following meanings. The singular forms "a", "an" and "the" include plural referents unless the context clearly dictates otherwise. The terms "comprising," "including," and "having" are intended to be inclusive, and mean that there may be additional elements other than the listed elements. The terms "upper", "lower", "top", "bottom", "first", "second", or the like are intended for the purpose of orienting the reader as to specific components parts. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary, without resulting in a change in the basic function to which it is related. Accordingly, a value modified by a term or terms, such as "about" and "substantially" is not limited to the precise value specified. In some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The term "airfoil" or "airfoil structure" as used herein refers to a part or surface, whose shape and orientation may control one or more of stability, direction, lift, thrust, or propulsion. Non-limiting examples of suitable airfoil structures include turbine blades (for example, aircraft engine blade, gas turbine blade, or wind turbine blade), compressor blades, fan blades, aircraft wings, and the like. In some embodiments, the airfoil is a fan blade of a gas turbine or an aircraft engine. In certain embodiments, the airfoil is an aircraft engine fan blade.

Figure 1:
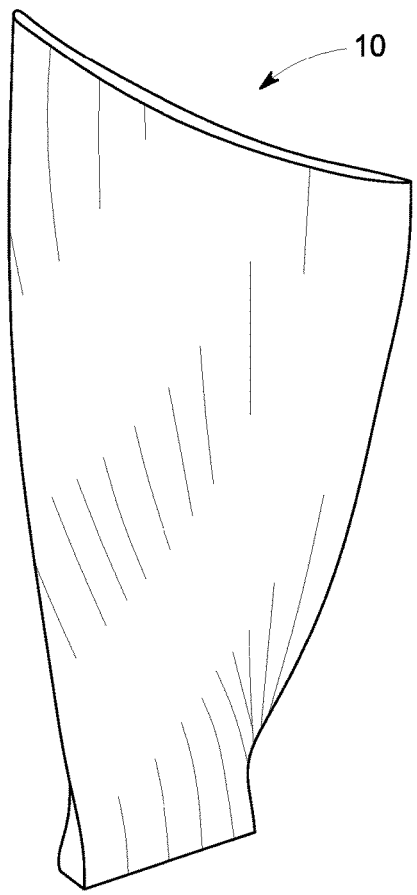
FIG. 1 is a schematic illustration of a typical composite fan blade.

FIG. 1 illustrates a typical composite airfoil or fan blade 10 constructed of a plurality of unidirectional prepreg layers (an "all-prepreg blade"). In conventional composite fan blades, the composite layers are impregnated with a resin compound prior to being arranged in a predetermined sequence to form a preform. The resin impregnated layers are referred to as "prepreg layers." The blade 10 is often shaped by inserting it into a blade mold and heat curing the blade until the resin hardens.

Figure 2:
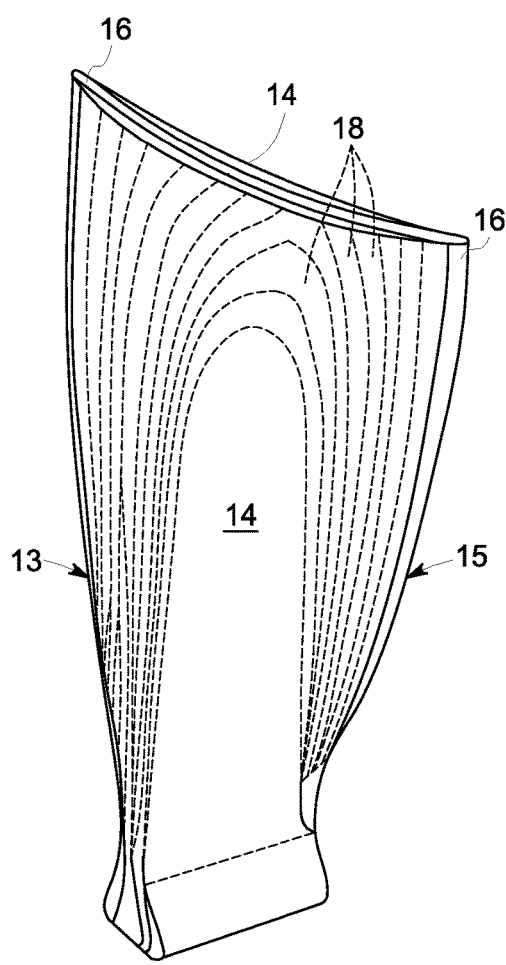
FIG. 2 is a schematic illustration of a fan blade with an outer casing substantially covering a composite core, in accordance with one embodiment of the invention.

FIG. 2 illustrates an airfoil structure 12 (for example, a blade) in accordance with one embodiment of the present invention. As shown in FIG. 2, the airfoil structure 12 has an outer casing 14 substantially surrounding a composite core 16. The outer casing 14 includes a plurality of unidirectional (UD) prepreg layers 18 (may also be referred to as "outer prepreg layers", "skin" or "prepreg skin"). According to some embodiments of present invention, the composite core 16 includes an interleaved structure that forms a woven insert (may also be referred to as a "fiber preform" or "preform"). The composite core 16 is skinned (or covered) with the outer prepreg layers 18 to fill out the airfoil structure and provide the fan blade shape. The outer prepreg layers 18 may add structural stiffness and high strain capability to the airfoil structure 12.

As used herein, the term "fiber" includes a single fiber, a filament, a thread, or a plurality of fibers, filaments, or threads. In one embodiment, the term "fiber" includes untwisted or twisted fibers, filaments, or threads. In one embodiment, the term "fiber" includes a strand, a tow, or a yarn. A term "tow", as used herein, refers to a plurality of untwisted filaments or fibers. In one embodiment, a tow may be characterized by a tow size. A "tow size" may refer to the number of filaments or fibers present within the tow. For example, a tow size of 5 k refers to a tow containing 5,000 fibers or filaments.

The outer prepreg layers 18 are arranged over the composite core 16 to provide any suitable configuration, for example as described in U.S. Pat. No. 5,279,892. The composite core 16 may be fully or partially covered by the outer prepreg layers 18. In certain embodiments, the outer prepreg layers 18 overlie the central composite core 16. In other words, the composite core 16 is sandwiched between a first set and a second set of prepreg outer layers 18 while exposed at a trailing edge 13 and a leading edge 15. In some embodiments, the composite core 16 is surrounded by the outer prepreg layers 18. In some instances, the thickness of the composite core 16 is substantially uniform throughout a length (i.e., a longitudinal direction) of the blade 12. In some other instances, the composite core 16 is thicker in a central portion as compared to that of the tips of the blade 12. In one instance, the prepreg layers 18 come together at a camberline of the blade 12. The trailing edge 13 and the leading edge 15 are often substantially identical throughout the length of the blade 12. Some other arrangements of the prepreg layers over a core, which are known in the art, are also within the scope of the invention.

Moreover, a transition layer (not shown) may be disposed on the composite core 16 before laying up the prepreg outer layers as described in U.S. Pat. No. 5,279,892. The transition layer may comprise, for example, a prepreg layer similar to prepreg layers 18. Alternatively, transition layer may be a woven non-unidirectional fabric or an adhesive layer. The transition layer may be referred to as a load transition layer because the stresses imposed upon composite core 16 are transitioned through the transition layer to prepreg layers and from prepreg layers to the composite core 16.

Figure 3:
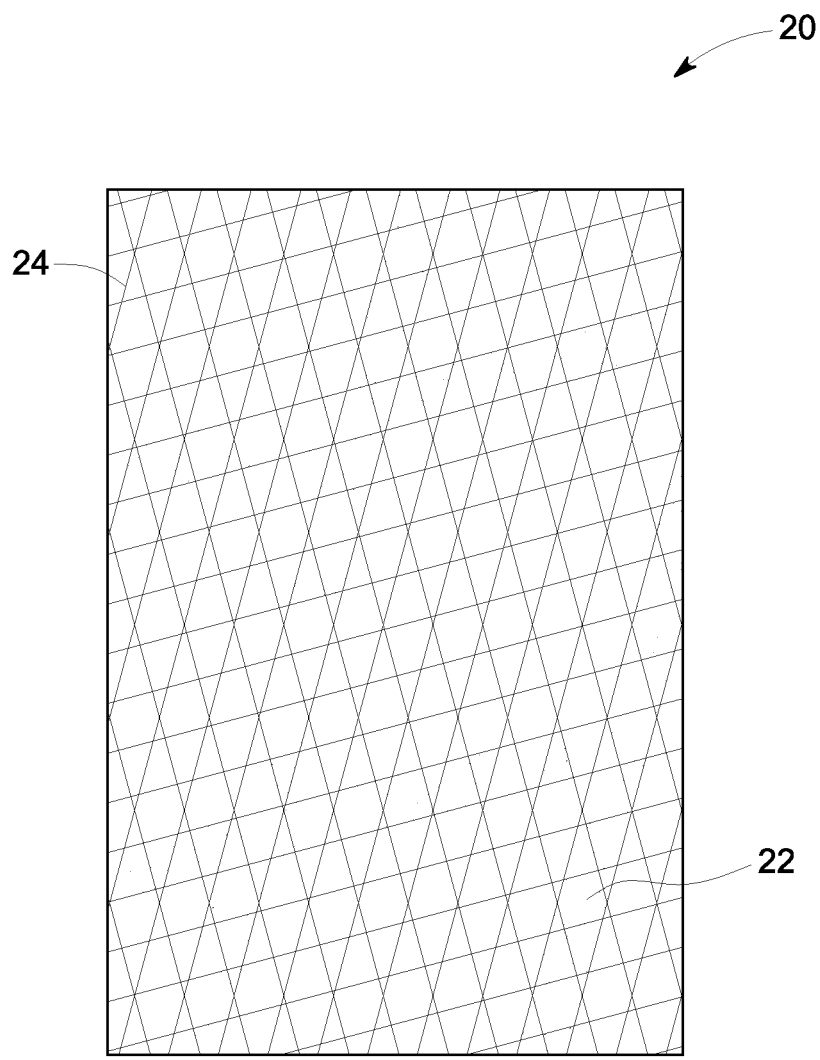
FIG. 3 schematically depicts a portion of a fiber preform for a composite core, in accordance with one embodiment of the invention.

FIG. 3 is a schematic illustration of a portion of a fiber preform 20 that may be used to fabricate the composite core or the woven insert 16 of the blade 12. The fiber preform 20 is formed of a plurality of fiber bands 22 that are interwoven, through interleaving, to provide improved strength. Each of the plurality of fiber bands 22 is individually placed at a predetermined position and orientation (described in detail below). These fiber bands 22 are interwoven in an in-plane and out-of-plane orientation by interleaving each of the plurality of fiber bands placed in a plane with one or more of the plurality of fiber bands 22 of an adjacent plane (that is the fiber bands that are laid down prior to laying up the plurality of fiber bands in a plane).

As illustrated in FIG. 3, the fiber preform 20 includes a plurality of fiber bands 22, each including a plurality of fiber tows or slit tapes 24 as described herein. In certain embodiments, each of the fiber tows 24 comprises a group of fibers. More particularly, in some embodiments, the fiber tows 24 comprise about 3,000 to about 50,000 fibers per tow. Typically, the strength of the fiber preform 20 is reduced when the fiber tows 24 contain more than 50,000 fibers, while manufacturing costs increase when the fiber tows contain fewer than 3000 fibers. As shown for example in FIGS. 4-8, the fiber tows 24 are grouped into a number of fiber bands 22 that are laid down to form a number of layers 32 (FIG. 11) (described below). The fiber bands 22 in a layer are interwoven in an in-plane and out-of-plane orientation by interleaving each of the plurality of fiber bands 22 with one or more of a plurality of fiber bands 22 in an adjacent layer previously laid down and not in a common plane.

Each band 22 contains one or more fiber tows 24 in a binder, such as a first resin as discussed below. That is the fiber bands 22 are used in prepreg form to manufacture the composite core structure. Each fiber tow 24 is defined by a fiber bundle with constant width. As shown in FIGS. 4-8, each of the plurality of fiber bands 22 comprise a plurality of fiber tows 24 positioned side by side at a predetermined spacing to define one or more gaps 26 between each tow 24 in a respective fiber band 22. In one embodiment, the predetermined spacing between the fiber tows is an integer multiple of the tow width. Referring more specifically to FIG. 5, in the illustrated example, the fiber band 22 comprises four fiber tows 24, separated by a plurality of gaps 26. In one embodiment, the fiber band 22 is approximately "a" inches wide, comprises four fiber tows 24, and has a gap 26 therebetween each fiber tow 24. In one embodiment, a=2.0 inches and each gap 26 has a dimension of approximately 0.25 inches, so as to be approximately equal to a width of each individual tow 24. In an alternate embodiment as illustrated in FIG. 6, a band 22 may include a plurality of fiber tows 24 separated by a gap 26 having a dimension greater than the width of each individual tow 24.

Figures 7, 8:
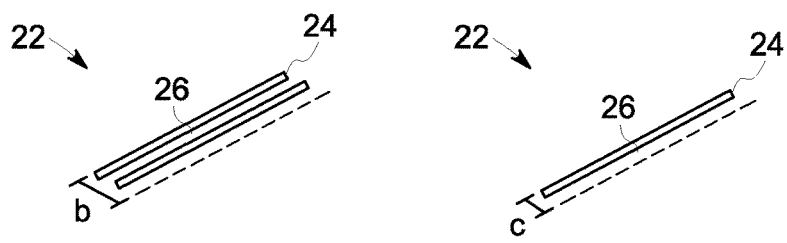
FIG. 7 schematically illustrates a plurality of fiber tows of a portion of an exemplary fiber band, in accordance with one embodiment of the invention.
FIG. 8 schematically illustrates a plurality of fiber tows of a portion of an exemplary fiber band, in accordance with one embodiment of the invention.

FIG. 7 illustrates a fiber band 22, wherein a width "b" is equal to approximately 1.0 inch, and includes two individual tows 24 having a gap 26 formed therebetween. FIG. 8 illustrates a fiber band 22, wherein a width "c" is equal to approximately 0.5 inch, and includes one tow 24 having a gap 26 between the tow 24 and an adjacent fiber band. It should be understood that while a plurality of fiber bands 22 have been illustrated and described as including a specific number of fiber tows 24 and comprising a specific dimensional width, this is not intended to be limiting and it should be understood that the plurality of fiber bands 22 may comprise any number of fiber tows 24 having a gap 26 formed therebetween each fiber tow 24.

FIGS. 9-15 depict consecutive steps for forming the fiber preform 20 for the composite core 16. A number of fiber bands 22, each comprising one or more tows 24, are disposed on a tool 30 by winding the fiber bands 22 to build up a number of layers 32. Initially, a first fiber band 22a is deposited on the tool 30 and extending at a first orientation angle α1, at a step 1. Next, a second fiber band 22b is deposited, at a step 2. The second fiber band 22b is deposited so as to extend at a second orientation angle α2, different from 180° with respect to the first band 22a, and wherein the second orientation angle α2 is not equal to the first orientation angle α1.

A third fiber band 22c is next deposited, in a step 3, so as to extend at a third orientation angle α3, different from 180° with respect to the first fiber band 22a and the second fiber band 22b, and wherein the third orientation angle α3 is not equal to the first orientation angle α1 and the second orientation angle α2. In one embodiment, a fourth fiber band 22d is next deposited, in a step 4, so as to extend at a fourth orientation angle α4, different from 180° with respect to the first fiber band 22a, the second fiber band 22b and the third fiber band 22c and wherein the fourth orientation angle α4 is not equal to the first orientation angle α1, the second orientation angle α2, and the third orientation angle α3. It should be understood that while the deposition of four fiber bands 22a, 22b, 22c and 22d, at four different orientation angles, α1, α2, α3, α4, respectively, to form a layer 32 is described herein, it is anticipated in one embodiment that the deposition of the plurality of fiber bands 22 at three different orientation angles may take place. The orientation angles α1, α2, α3, α4 are relative to a predetermined 0° direction. As an example, one embodiment including the deposition of three fiber bands at 0°, 60° and −60° (relative to 0°), is contemplated herein.

Next, in a step 5, steps 1-4 are repeated to form additional layers 32 as illustrated in FIG. 10, such that each deposited fiber band 22a, 22b, 22c, 22d, etc., has a predetermined spacing "x" from a previously deposited fiber band deposited at an equivalent orientation angle. It should be understood that the predetermined spacing "x" is an integer multiple of the tow width and may vary with respect to each orientation of the multiple bands 22. For example, the spacing "x" between the first deposited fiber band 22a and subsequently deposited fiber band 22a may not be equal to the spacing "x" between first deposited fiber band 22b and subsequently deposited fiber band 22b, and so forth. Steps 1-4 are repeated until a plurality of deposited fiber bands 22a, 22b, 22c, 22d, etc., fill all the fiber bands to a uniform whole fraction (e.g. ½ or ⅓) with the predefined spacings, as illustrated in FIG. 11. Step 5 is repeated until the gaps created by the spacing "x" between the fiber bands 22 are completely covered.

In a step 6, step 5 is repeated until complete coverage is achieved by depositing an additional plurality of fiber bands 22a, 22b, 22c and 22d, as illustrated in FIGS. 12-15, such that each band placed during the initial steps 1-5 is placed immediately adjacent to a respective fiber band 22 with the same orientation angle placed during the subsequent deposition of additional fiber bands 22, as indicated by adjacently deposited fiber bands 22a-22a in FIG. 13. In step 6, step 5 is repeated until the spacing "x" between the fiber bands 22 is completely covered.

Figure 16:
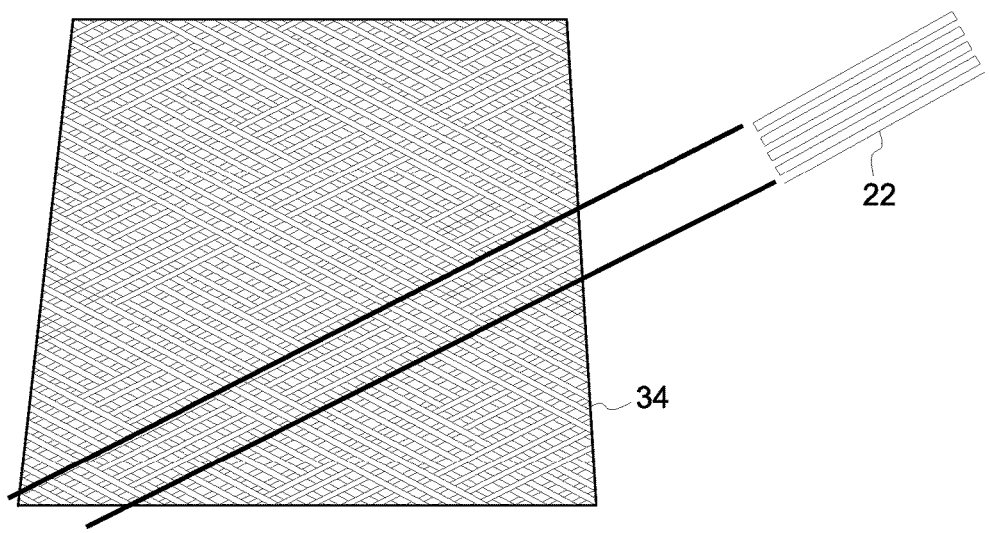
FIG. 16 schematically illustrates a layered assembly formed using steps 1-6, in accordance with one embodiment of the invention.

Steps 1-6 generate multiple (n) layers 32 of fiber bands 22 (including gaps 26) with multiple orientation angles (n) to form an interwoven and uniformly covered layered assembly 34 (FIG. 12 and FIG. 16). Subsequent layered assemblies, each formed according to steps 1-6, are deposited next to the tow 24 (FIG. 5) in a previous layered assembly 34 to fill the gaps 26 and form a completely covered ply. When the gap 26 is larger than one tow width as shown in FIG. 6, steps 1-6 are repeated to completely cover the gaps 26 and complete the ply.

Based on the geometry of the desired structure, size, orientation angle and fiber band width, each of steps 1-4, as previously described, may be repeated as a subset within the overall steps. The planar dimensions of each layer, each layered assemblies or plies can be tailored to achieve or develop a desirable architecture and thickness profile of the composite core 16. Steps 5 and 6 would then be performed as stated thereafter.

Figure 4:
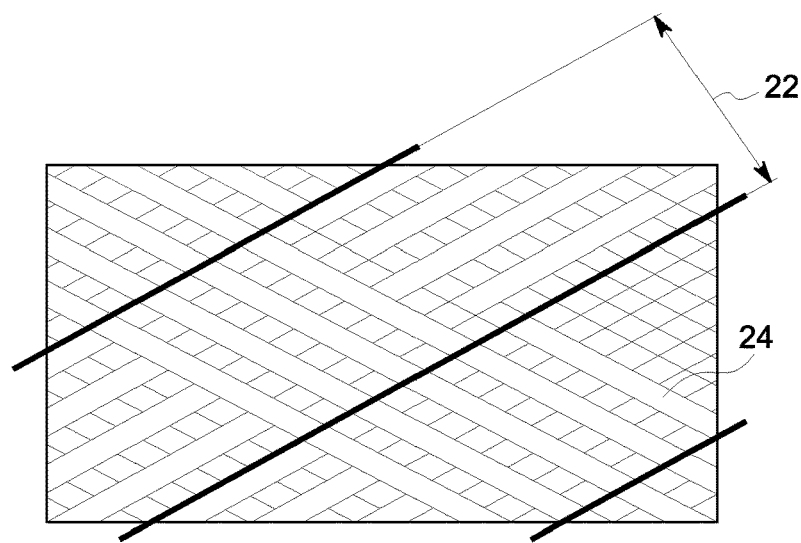
FIG. 4 schematically illustrates a partially completed layup showing a portion of exemplary fiber bands, in accordance with one embodiment of the invention.
Figures 5, 6:
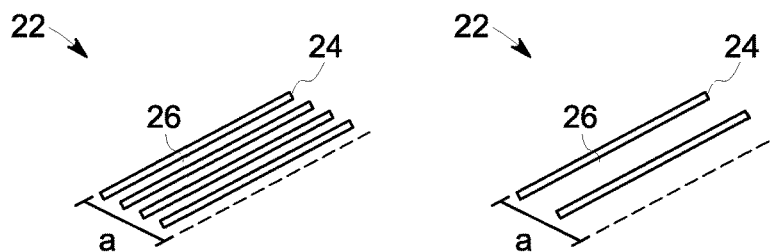
FIG. 5 schematically illustrates a plurality of fiber tows of a portion of an exemplary fiber band, in accordance with one embodiment of the invention.
FIG. 6 schematically illustrates a plurality of fiber tows of a portion of an exemplary fiber band, in accordance with one embodiment of the invention.

For an exemplary embodiment, as best illustrated by FIGS. 3, 4 and 15, the steps comprise grouping the fiber tows 24 into a number of bands 22 and interweaving in an in-plane and out-of-plane orientation by interleaving each of the plurality of fiber bands 22 with one or more of the plurality of fiber bands 22 previously laid down and not in a common plane to form an interleaved structure or winding pattern. The gaps 26 in each of the fiber bands 22, as shown in FIGS. 5-8, generate a secondary, fiber tow 24 based, interleaving within the band 22 as illustrated in FIGS. 4 and 16. This interleaving may form at least one winding pattern along at least a portion of one or more of the layers 32. For example, as previously described with reference to FIGS. 5-8, the fiber tows 24 are grouped to form the fiber bands 22. The width of the bands 22 can be adjusted by including more or less tows 24 in each of the fiber bands 22. In addition, the tightness of the winding pattern may be adjusted to vary the winding pattern.

Desirably, the fabrication of the fiber preform 20 (FIG. 3), and thus the composite core 16 (FIG. 2), is tailorable for protection against multiple size threats, where the optimal unit cell size depends on the size of the impacting object. For certain embodiments, at least one of the fiber bands 22 of tows 24 has a first width and at least one of the bands 22 of tows 24 has a second width, where the first and the second widths are different. For example, in one embodiment, the width of the fiber bands 22 may vary from about 0.125 inches (0.3175 cm) to about 6 inches (15.24 cm). Smaller width bands protect against smaller projectiles, for example engine fragments, whereas larger width bands protect against larger projections, for example birds and large pieces of ice that are shed from the spinner cone of the engine. In addition, the tightness of the winding pattern may be adjusted.

Without being bound by any theory, it is believed that the interleaved structure as a core reinforcement may increase mechanical integrity and reduce fan blade material loss during the high energy impact events from foreign objects and large birds relative to the conventional unidirectional (UD) structures (all UD structure or with 3D woven insert). The UD skin may provide the desired stiffness and frequency over woven structures (such as 3D woven structure) for the fan blades, especially for larger blades with longer spans. In addition, as UD laminates have higher strengths compared to woven structures, the placement of the thick UD skins on the outer surfaces of the interleaved core blade may allow the blade to retain an equally high damage initiation threshold compared to an all UD blade.

A fiber band may include a plurality of fiber tows that may comprise the same or different materials. In one embodiment, the plurality of fiber tows comprises a carbon fiber. Suitable examples of carbon fibers include, but are not limited to, AS2C, AS4, AS4C, AS4D, AS7, IM6, IM7, IM9, and PV42/850 from Hexcel Corporation; TORAYCA T300, T300J, T400H, T600S, T700S, T700G, T800H, T800S, T1000G, M35J, M40J, M46J, M50J, M55J, M60J, M305, M30G, and M40from Toray Industries, Inc; HTS12K/24K, G30-500 3K/6K/12K, G30-500 12K, G30-700 12K, G30-700 24K F402, G40-800 24K, STS 24K, HTR 40 F22 24K 1550tex from Toho Tenax, Inc; 34-700, 34-700WD, 34-600, 34-600WD, 34-600 from Grafil Inc.; and T-300, T-650/35, T-300C, T-650/35C from Cytec Industries.

In some embodiments, the plurality of fiber tows comprises a glass fiber, a ceramic fiber, a polymer fiber or combinations thereof. Suitable examples of fibers include, but are not limited to, glass fibers (for example, quartz, E-glass, S-2 glass, R-glass from suppliers such as PPG, AGY, St. Gobain, Owens-Corning, or Johns Manville), polyester fibers, polyamide fibers (for example, NYLON® polyamide available from E.I. DuPont, Wilmington, Del., USA), aromatic polyamide fibers (such as KEVLAR® aromatic polyamide available from E.I. DuPont, Wilmington, Del., USA; or P84® aromatic polyamide available from Lenzing Aktiengesellschaft, Austria), polyimide fibers (for example, KAPTON® polyimide available from E.I. DuPont, Wilmington, Del., USA), and extended chain polyethylene (for example, SPECTRA® polyethylene from Honeywell International Inc., Morristown, N.J., USA; and DYNEEMA® polyethylene from Toyobo Co., Ltd.).

As mentioned earlier, the composite core includes the first resin. The interleaved structure is substantially impregnated with the first resin. The term "substantially impregnated" as used herein means that greater than 50 volume percent of the interleaved structure is in contact with the first resin. In some embodiments, the first resin is present in the composite core in an amount corresponding to from about 10 weight percent to about 80 weight percent based upon a total weight of the composite core. In another embodiment, the first resin is present in the composite core 16 in an amount corresponding to from about 20 weight percent to about 70 weight percent based upon a total weight of the composite core.

In some embodiments, the first resin is epoxy, vinylester, polyimide, bismaleimide, phenol formaldehyde, polyurethane, CBT (cyclic polybutylene terephthalate), or polyester. In one embodiment, the first resin includes an epoxy resin. In some embodiments, a suitable epoxy resin includes or is derived from one or more of the following materials: polyhydric phenol polyether alcohols, glycidyl ethers of novolac resins such as epoxylated phenol-formaldehyde novolac resin, glycidyl ethers of mononuclear di-and trihydric phenols, glycidyl ethers of bisphenols such as the diglycidyl ether of tetrabromobisphenol A, glycidyl ethers of polynuclear phenols, glycidyl ethers of aliphatic polyols, glycidyl esters such as aliphatic diacid diglycidyl esters, glycidyl epoxies containing nitrogen such as glycidyl amides and amide-containing epoxies, glycidyl derivatives of cyanuric acid, glycidyl resins from melamines, glycidyl amines such as triglycidyl ether amine of p-aminophenol, glycidyl triazines, thioglycidyl ethers, silicon-containing glycidyl ethers, monoepoxy alcohols, glycidyl aldehyde, 2,2'-diallyl bisphenol A diglycidyl ether, butadiene dioxide, or bis(2,3-epoxycyclopentyl)ether.

In some embodiments, a suitable epoxy resin, alternative to the above, includes or is derived from: octadecylene oxide, epichlorohydrin, styrene oxide, vinylcyclohexene oxide, glycidyl methacrylate, diglycidyl ether of Bisphenol A (for example, those available under the trade designations "EPON 828," "EPON 1004," and "EPON 1001 F" from Shell Chemical Co., Houston, Tex., and "DER-332" and "DER-334", from Dow Chemical Co., Midland, Mich.), diglycidyl ether of Bisphenol F (for example, those under the trade designations "ARALDITE GY281" from Ciba-Geigy Corp., Hawthorne, N.Y., and "EPON 862" from Shell Chemical Co.), vinylcyclohexene dioxide (for example the product designated "ERL 4206" from Union Carbide Corp., Danbury, Conn.), 3,4-epoxycyclohexyl-methyl-3,4-epoxy-cyclohexene carboxylate (for example the product designated "ERL-4221" from Union Carbide Corp.), 2-(3,4-epoxycyclohexyl-5,5-spiro-3,4-epoxy) cyclohexane-metadioxane (for example the product designated "ERL-4234" from Union Carbide Corp.), bis(3,4-epoxycyclohexyl) adipate (for example the product designated "ERL-4299" from Union Carbide Corp.), dipentene dioxide (for example the product designated "ERL-4269" from Union Carbide Corp.), epoxidized polybutadiene (for example the product dsignated "OXIRON 2001" from FMC Corp.), epoxy silanes for example, beta-3,4-epoxycyclohexylethyltrimethoxysilane and gamma-glycidyloxypropyltrimethoxysilane, 1,4-butanediol diglycidyl ether (for example the product designated "ARALDITE RD-2" from Ciba-Geigy Corp.), hydrogenated bisphenol A diglycidyl ether (for example the product designated "EPONEX 1510" from Shell Chemical Co.), or polyglycidyl ethers of phenol-formaldehyde novolaks (for example the products designated "DEN-431" and "DEN-438" from Dow Chemical Co.).

Referring again to FIG. 9, as shown, multiple fiber tows 24 are brought together and then laid down as fiber bands 22a-22d on the tool 30 to form the fiber preform 20. Depending on the desired properties, the same or different fiber types (as described previously) may be used. In one embodiment, the fibers used to form the interleaved structure may comprise yarn-carbon fibers.

In certain instances, it is desirable to use multiple fiber types to form the composite core preform. Accordingly, for certain embodiments, at least one of the fiber tows 24 comprises a first material and at least one of the fiber tows comprises a second material. The fiber types may be mixed within a given layer or ply, or different plies may be formed using different fiber types. In one example, hard, shear resistant fibers may be incorporated at an impact surface, while the fiber near a back surface may be selected for enhanced energy absorption. Non-limiting examples of hard, shear resistant fibers include metallic or ceramic fibers as described previously. Non-limiting examples of fibers with relatively high energy absorption include S-glass, aramid fibers (e.g., Kevlar® and Twaron®), as well as oriented polyethylene fibers, such as Spectra® and Dyneem®. Kevlar® is sold by E. I du Pont de Nemours and Company, Richmond Va. Twaron® aramid fibers are sold by Tejin Twaron, the Netherlands. Spectra® fiber is sold by Honeywell Specialty Materials, Morris N.J. Dyneema® fiber is sold by Dutch State Mines (DSM), the Netherlands.

In other instances, it is desirable to form mixed fiber type plies. Referring to FIG. 3 again, at least one of the fiber bands 22 is formed using at least one tow 24 comprising a first material and at least one of the fiber bands 22 is formed using at least one tow 24 comprising a second material. For example, glass fibers may be interlaced with carbon (graphite) fibers to enhance the toughness of the resultant composite core.

In other instances, the fiber tows 24 comprising the first and second materials are laid down on different regions of the fiber preform 20 (FIG. 3). For example, a high toughness fiber (such as S-glass) may be laid down in the impact zones, while a high strength fiber (such as carbon fiber) is laid down in non-impact zones, within one or more plies.

Referring to FIG. 2 again, the layup of prepreg layers 18 according to some embodiments of the present invention, forms the outer casing 14. The prepreg layers 18 may be formed from sheets of unidirectional intermediate modulus, high strain carbon fibers that are coated with resin. Prepreg layers often take on a "grain" according to the orientation of the fibers. FIG. 2 illustrates an airfoil structure 12 according to some embodiments of the present invention in which the grain orientation of various prepreg layers is shown. In one embodiment, illustrated in FIG. 2, the grain orientation of each prepreg layer is rotated by approximately 45° with respect to the grain orientation of the adjacent prepreg layers in the stack. For example, the grain of one layer is rotated 45° from the grain of adjacent layer, as illustrated in FIG. 2. By rotating the grain orientation of the adjacent layers, the strength and stiffness of the stack may be customized to the loadbearing requirements of the airfoil structure 12.

In some embodiments, the outer layers 18 may include a second resin. The first resin and the second resin may be the same or different. In some embodiments, the second resin may include an epoxy resin as described herein earlier. Non-limiting examples of suitable second resin include HexPly 8551-7, HexPly M91, HexPly 8552, HexPly M21, Toray 3900 series resin, CYCOM 977-2 or combinations thereof. One or both of the first resin and the second resin may include a toughening agent. Non-limiting examples of suitable toughening agents include thermoplastic materials such as polysulfone, methacrylates and polyetherimide, and elastomeric materials such as CTBN, silicone, polyurethanes, and combinations thereof.

In some embodiments, a film adhesive layer (not shown) may be used between the innermost prepreg layer and the preform. The adhesive film is typically designed to cure at the same temperature as the prepreg layers and the preform.

A composite fan blade including the airfoil structure as described herein is also presented. In some embodiments, a turbo-engine includes the composite fan blade. As mentioned previously, in some embodiments, the airfoil structure is a component of a fan blade of an aircraft engine.

One embodiment is directed to a method for forming an airfoil structure. In one embodiment, the method may include a first step (a) for disposing a first set of a plurality of unidirectional prepreg layers. Next step (b) includes disposing a plurality of fiber bands at a predetermined position and orientation at a time so as to interweave the plurality of fiber bands in an in-plane and out-of-plane orientation by interleaving each of the plurality of fiber bands placed in a plane with one or more of the plurality of fiber bands of an adjacent plane to define an interleaved structure disposed on the first set of unidirectional prepreg layers. The fiber bands are disposed in form of prepreg i.e., with a first resin (described above). The process steps for disposing the interleaved structure are previously described in detail. The interleaved structure, once completed, comprises the core of the airfoil structure. As discussed with respect to FIGS. 9-15, various steps may be repeated to develop a desirable geometry and thickness profile of the composite core. The method further includes a step (c) for disposing a second set of the plurality of unidirectional prepreg layers on the interleaved structure to complete the airfoil structure.

In one embodiment, an automated fiber placement (AFP) process can be used for forming the composite core as well as the outer skin i.e., the unidirectional prepreg layers. The AFP process may utilize individual fiber tows, groups of fiber tows, or slit tapes generally comprising a plurality of longitudinally oriented fibers in a resin binder (i.e., prepreg layers). A plurality of individual fiber tows may be formed into a fiber band that is deposited onto a surface of a tool. A textile type composite may be fabricated via the layup of a plurality of the fiber bands, including varying orientations, according to a fiber placement process, so as to form a textile fiber preform. The use of AFP for the buildup of the plurality of layers, or plies, and more specifically, the ability to maneuver predetermined complex paths, provides for the fabrication of complex composite structures.

In one embodiment, the composite core is formed in-situ while manufacturing the airfoil structure. For example, the first set of the plurality of UD prepreg layers is laid down on a tool by using an automated fiber placement (AFP) machine. After laying down the first set of the plurality of UD prepreg layers, the AFP machine is switched to lay down the fiber bands on the tool for manufacturing the interleaved structure as described with respect to FIGS. 9-15. The fiber bands for the interleaved structure are disposed on the first set of the plurality of UD layers. After completion of manufacturing of the composite core structure, the AFP machine is again switched to lay up the second set of the plurality of UD prepreg layers on the tool to cover the composite core structure to thereby complete the airfoil structure. The use of AFP process thus allows the in-situ fabrication of the interleaved core structure while manufacturing the airfoil structure. In some embodiments, multiple AFP machines may be used for the placement of various prepreg layers and fiber bands on one tool.

As described, the in-situ fabrication/formation of the core thus enables the manufacturing of the airfoil structure in a single process step on a single tool. As compared to known woven structures, for example a three-dimensional (3D) woven blade, the present invention provides a core structure that can be built or manufactured in-situ while constructing the airfoil structure or a fan blade. In contrast, a 3D preform is usually manufactured on a loom and is required to fit into the highly irregular geometry of a mold. In the present method, the airfoil structure including the core may be fabricated to an exact shape of the mold in a single process step and on a single tool, and would therefore possess less fiber strain and correspondingly higher strength. Further, the material cost and manufacturing cost of disclosed composite airfoil including the interleaved composite core and the UD skin may be lower than the 3D (including partial 3D) woven blades.

The method may further include heating the resulting airfoil structure to cure the resin at the end of the laying down process. The curing technique may vary depending on the type of resin used, however suitable examples of curing techniques include heating the resin, or exposing the resin to ultraviolet (UV) radiation. One common example of heating is accomplished by application of infrared (IR) radiation to the resin or by placement in an enclosed oven or autoclave. The resin chemistry will dictate the type of curing technique that can be used. In one embodiment, the first resin, the second resin or both may include epoxies that may be cured at about 350° F. Alternatively, the first resin may include a toughened, no shrink, high $T_g$ (glass transition temperature) injectable resin that cures at the same temperature as the second resin.

As noted previously, there are many benefits of the above-described composite core formed including the interleaved structure for airfoils or blades. Such benefits include impact resistance to large and small threats, added strength and decrease in delamination of the plies. Additionally, the single process step method may provide the overall ability to incorporate a variety of features, such as different materials, different tow thicknesses and different winding patterns into the composite core. Other benefits include reduced weight, ease of manufacturing, and potential cost savings.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An airfoil structure comprising an outer casing substantially surrounding a composite core, wherein the composite core is an interleaved structure substantially impregnated with a first resin and wherein the interleaved structure comprises a plurality of fiber bands, each of the plurality of fiber bands is placed at a predetermined position and orientation at a time, wherein the plurality of fiber bands are interwoven in an in-plane and out-of-plane orientation by interleaving each of the plurality of fiber bands placed in a plane with one or more of the plurality of fiber bands of an adjacent plane to define the interleaved structure.

2. The airfoil structure of claim 1, wherein the outer casing comprises a plurality of unidirectional prepreg layers.

3. The airfoil structure of claim 2, wherein the plurality of unidirectional prepreg layers comprises carbon fibers.

4. The airfoil structure of claim 1, wherein each of the plurality of fiber bands is placed in three or more different orientation angles.

5. The airfoil structure of claim 4, wherein
a first plurality of fiber bands is oriented at a first orientation angle;
a second plurality of fiber bands is oriented at a second orientation angle, wherein the second orientation angle is not equal to the first orientation angle; and
a third plurality of fiber bands is oriented at a third orientation angle, wherein the third orientation angle is not equal to the first orientation angle and the second orientation angle.

6. The airfoil structure of claim 5, wherein a first orientation angle is 0°, a second orientation angle is 60° and a third orientation angle is −60°.

7. The airfoil structure of claim 5, further comprising one or more additional plurality of fiber bands, each oriented at an additional orientation angle, wherein the additional orientation angle is not equal to the first orientation angle, the second orientation angle, and the third orientation angle.

8. The airfoil structure of claim 1, wherein each of the plurality of fiber bands comprise a plurality of fiber tows positioned side by side at a predetermined spacing to define one or more gaps between each tow in the fiber band.

9. The airfoil structure of claim 8, wherein the plurality of fiber tows and fiber bands placed in a plane are interwoven with one or more of the plurality of fiber tows and fiber bands in an adjacent plane such as to fill the gaps.

10. The airfoil structure of claim 1, wherein the airfoil structure is manufactured by using an automated fiber placement (AFP) process.

11. The airfoil structure of claim 1, wherein the outer casing further comprises a second resin.

12. A composite fan blade comprising the airfoil structure in accordance with claim 1.

13. A turbo-engine comprising the composite fan blade in accordance with claim 12.

* * * * *